Patented Feb. 19, 1952

2,585,935

UNITED STATES PATENT OFFICE 2,585,935

QUATERNARY SALTS OF PYRIMIDYLAMINO-CINNOLINES AND PROCESS OF PREPARING SAME

Walter Hepworth, Blackley, Manchester, England, and Francis Henry Swinden Curd, deceased, late of Blackley, Manchester, England, by Muriel Ruth Curd, executrix, Bramhall, England, assignors to Imperial Chemical Industries Limited, a corporation of Great Britain No Drawing. Application November 3, 1949, Serial No. 125,375. In Great Britain November 5, 1948

12 Claims. (Cl. 260—250)

This invention relates to new cinnoline derivatives and more particularly it relates to a process for the manufacture of the mono- and di-quaternary salts of pyrimidyl-aminocinnolines possessing trypanocidal activity.

According to our invention we make the said new compounds, which are of the formula Pq—NH—A wherein P stands for a 2-, 4- (or 6-) amino- or lower alkylamino-substituted pyrimidine nucleus which is attached to the linking —NH— group at another of the 2-, 4- (or 6-) positions and which may be further substituted in the remaining 2-, 4- (or 6-) position by a lower alkyl radical, an amino group, or a lower alkylamino group, A stands for Q or Qq, wherein Q stands for a cinnoline nucleus which is substituted in the 4-position by an amino or lower alkylamino group and which may be further substituted by a lower alkyl group or groups, and which bears the linking —NH group in the 6-position and the symbols q indicate that the preceding nuclei P and Q respectively, are present in the form of their quaternary salts, by a process which comprises reacting a compound of the formula PqX wherein P and q have the significance stated above and X stands for a halogen atom or the group —SR, wherein R stands for a hydrocarbon radical, with a compound of the formula NH₂A wherein A has the significance stated above.

The starting materials of the formula PpX may be made by the process described in co-pending U. S. application Ser. No. 44,234, filed August 13, 1948, namely by the treatment of the substituted pyrimidine derivative PX with a quaternary salt-forming agent for example with methyl iodide, dimethylsulphate, diethyl sulphate, or methyl p-toluene sulphonate.

The process of the invention may be carried out by heating the reactants together conveniently but not necessarily in a liquid medium and in presence of an acid. Suitable liquid media include for example water and suitable acids include for example hydrochloric acid. The substance NH₂A may, if desired, be used in the form of a salt thereof. The substance NH₂A may, moreover, be added to the reaction mixture in the form of a substance which will give rise to the substance NH₂A under the conditions of reaction, for example in the form of an acyl derivative thereof.

The products of the invention may, as indicated above, be represented by the generic formula PqNHA wherein the symbols are as designated hereinbefore. We have found that substances which conform to this formula possess the property in common of powerful trypanocidal activity as tested in mice against Trypanosoma species.

Some of the new compounds of this invention may be made also by the process of co-pending U. S. application S. N. 125,376, filed November 3, 1949, namely those of the formula Pq—NH—Qq Although these substances are described and represented herein as di-quaternary salts of pyrimidylaminocinnolines, it will be understood that they can also be formulated and named as salts of mono-quaternary salts of dihydropyrimidylaminocinnolines or of pyrimidylaminodihydrocinnolines or again as di-salts of dihydropyrimidylaminodihydrocinnolines.

The invention is illustrated but not limited by the following examples in which the parts are by weight:

*Example 1*

3 parts of 4:6-diaminocinnoline 1-methiodide, 3 parts of 4-chloro-2-amino-6-methylpyrimidine 1-methiodide, 1 part of aqueous N-hydrochloric acid and 50 parts of water are boiled together under reflux for 1 hour. 5 parts of sodium iodide are then added to the reaction mixture which is then cooled and filtered. The solid residue is crystallised from water and there is obtained 4-amino-6-(2' - amino-6' - methylpyrimidyl - 4'-amino) cinnoline 1:1'-dimethiodide, as yellow needles, M. P. 305° C. (decomp.).

To obtain the corresponding dimethochloride one may proceed as follows:

1.75 parts of the di-iodide are dissolved in 160 parts of water at 80° C. and an excess of silver chloride (freshly prepared from 1.2 parts of sodium chloride and 2.55 parts of silver nitrate in 40 parts of water) is added. The mixture is stirred at 80° C. for 30 mins. and is then filtered hot. 20 parts of sodium chloride are added to the filtrate which is then cooled and filtered. The solid residue is washed with acetone and dried. It is crystallised from dilute aqueous sodium chloride and there is obtained 4-amino-6(2'-amino-6'-methylpyrimidyl-4'-amino) cinnoline 1:1'-dimethochloride M. P. 298° C. (decomp.).

The 4:6-diaminocinnoline 1-methiodide used as starting material in this example may be obtained as follows:

7 parts of 6-nitro-4-aminocinnoline (Kereford, Schofield, and Simpson, Journal of the Chemical Society, 1948, 360), 60 parts of nitrobenzene and 4 parts of dimethyl sulphate are stirred together at 90° C. for 1 hour. The mixture is cooled and filtered and the solid is washed with benzene and dried. It is then crystallised from ethyl alcohol and there is obtained 6-nitro-4-aminocinnoline 1-methomethylsulphate M. P. 234–6° C. This substance is dissolved in water and the solution is treated with sodium iodide and filtered. The solid residue is crystallised from 95% ethyl alcohol and there is obtained 6-nitro-4-aminocinnoline 1-methiodide as orange needles M. P. 207° C. (decomp.).

10 parts of iron powder, 40 parts of water and 5 parts of aqueous N-hydrochloric acid are stirred at 100° C. for 30 minutes and 12 parts of this 6-nitro-4-aminocinnoline 1-methiodide are added to the mixture which is stirred at 100° C. for 2 hours. 20 parts of aqueous 2N hydrochloric acid are then added at a speed of 2 parts per hour and heating is then continued for 3 hours. The mixture is then made alkaline with sodium carbonate and is filtered hot. To the filtrate is added an excess of sodium iodide and it is then cooled and filtered. The solid is crystallised from water and there is obtained 4:6-diaminocinnoline 1-methiodide M. P. 284° C.

Example 2

1.6 parts of 4:6-diaminocinnoline are dissolved in 20 parts of aqueous N-hydrochloric acid and 2.9 parts of 4-chloro-2-amino-6-methylpyrimidine-1-methiodide are added to the solution which is then boiled under reflux for 1 hour. Then 5 parts of sodium iodide are added to it and it is cooled and filtered. The solid residue is crystallised from water and there is obtained 4-amino-6(2'-amino-6'-methylpyrimidyl-4' - amino)cinnoline 1'-methiodide hydriodide dihydrate M. P. 296–7° C.

By the addition of sodium carbonate to an aqueous solution of the above hydriodide the methiodide base may be obtained M. P. 320° C. (decomp.).

The 4:6-diaminocinnoline used as starting material in the process of this example may be obtained as follows:

5 parts of 6-nitro-4-aminocinnoline, 1 part of Raney nickel and 50 parts of glacial acetic acid are shaken together in an atmosphere of hydrogen until the theoretical amount of hydrogen is absorbed. The mixture is then filtered and the filtrate is made alkaline with aqueous sodium hydroxide. The mixture is filtered and the solid residue is washed with water and dried. It is crystallised from water and there is obtained 4:6-diaminocinnoline, M. P. 268–270° C.

Example 3

3 parts of 6-acetamido-4-aminocinnoline, 4.3 parts of 4-chloro-2-amino-6-methylpyrimidine-1-methiodide and 45 parts of aqueous N-hydrochloric acid are boiled together under reflux for 1 hour. 10 parts of sodium iodide are then added to the mixture which is then cooled and filtered. The solid residue is crystallised from water and there is obtained 4-amino-6-(2'-amino-6'-methylpyrimidyl-4'-amino) cinnoline 1' - methiodide hydriodide dihydrate M. P. 296–7° C.

The 6-acetamido-4-aminocinnoline used as starting material in the process of this example may be obtained as follows:

3.2 parts of 4:6-diaminocinnoline are dissolved in glacial acetic acid and 2 parts of acetic anhydride are added. The mixture is heated at 90° C. for 15 minutes, then poured into water and the mixture is made alkaline with 35% ammonia and filtered. The solid residue is crystallised from water and there is obtained 6-acetamido-4-aminocinnoline M. P. 361° C. (decomp.).

Example 4

1.5 parts of 4:6-diaminocinnoline, 1.9 parts of 4 - iodo - 2 - amino-6-methylpyrimidine 3-methiodide, 30 parts of water and 1 part of aqueous N-hydrochloric acid are boiled together under reflux for 12 hours. The mixture is then made alkaline with sodium carbonate and is then cooled and filtered. The solid residue is crystallised from water and there is obtained 4-amino-6(2' - imino - 3':6'-dimethylolpyrimidyl-4'-amino)cinnoline, M. P. 308° C. (decomp.). This anhydro-base is dissolved in a small volume of dilute aqueous hydrochloric acid and sodium iodide is added. The mixture is then filtered and the solid is crystallised from ethyl alcohol and acetone when there is obtained 4-amino-6-(2'-amino-6'-methylpyrimidyl-4'-amino)cinnoline 3'-methiodide hydriodide M. P. 172–4° C. (decomp.).

Example 5

5 parts of 4:6-diaminocinnoline, 4.5 parts of 4-chloro - 2:6 - diaminopyrimidine 3-methiodide and 30 parts of aqueous N-hydrochloric acid are boiled together under reflux for 18 hours. The mixture is cooled and 10 parts of sodium iodide are added to it. It is then filtered and the solid is crystallised from dilute aqueous hydriodic acid when there is obtained 4-amino-6-(2':6'-diaminopyrimidyl - 4' - amino)cinnoline-3'-methiodide hydriodide, M. P. 342° C. (decomp.).

Example 6

1.5 parts of 4:6-diaminocinnoline 1-methiodide, 1.5 parts of 4-chloro-2-methylamino-6-methylpyrimidine 1-methiodide, 30 parts of water and 1 part of aqueous N-hydrochloric acid are boiled together under reflux for 1 hour. The mixture is then cooled and filtered. The solid residue is crystallised from water and there is obtained 4-amino-6-(2'-methylamino-6'-methylpyrimidyl-4'-amino)cinnoline 1:1'-dimethiodide, M. P. 310° C. (decomp.).

Example 7

1 part of 6-amino-4-methylaminocinnoline 1-methiodide, 1 part of 4-chloro-2-methylamino-6-methylpyrimidine 1-methiodide, 10 parts of water and 4 parts of aqueous N-hydrochloric acid are boiled together under reflux for 2 hours. The mixture is then cooled and filtered. The solid residue is dissolved in water and 5 parts of sodium iodide are added. The resultant mixture is filtered and the solid is crystallised from water when there is obtained 4-methylamino-6-(2'-methylamino - 6' - methylpyrimidyl-4'-amino)-cinnoline 1:1'- dimethiodide, M. P. 272–4° C.

The starting material used in the process of this example may be obtained as follows:

13.5 parts of 6-nitro-4-phenoxycinnoline, (Kereford, Schofield, and Simpson, Journal of the Chemical Society, 1948, 359), 10.2 parts of methylamine hydrochloride, 8 parts of phenol and 6 parts of sodium hydroxide are mixed and stirred at 180° C. for 5 minutes. The mixture is cooled and extracted with 300 parts of 35% acetic acid. The extract is made alkaline with 35% ammonium hydroxide and filtered. The solid residue is washed with water and dried when there is obtained 6-nitro-4-methylaminocinnoline, M. P. above 360° C.

10 parts of this 6-nitro-4-methylaminocinnoline, 80 parts of nitrobenzene and 5.3 parts of dimethyl sulphate are stirred at 100° C. for 3 hours. The mixture is cooled and filtered. The solid residue is washed with benzene and dried. It is dissolved in water, an excess sodium iodide is added and the solid is filtered off and crystallised from 95% ethyl alcohol. There is obtained 6-nitro - 4 - methylaminocinnoline 1-methiodide, M. P. 244° C. (decomp.).

4 parts of iron powder, 50 parts of water and 1 part of 36% hydrochloric acid are stirred at 100° C. for 30 minutes and then 5 parts of this 6-nitro-4-methylaminocinnoline 1-methiodide are added during one hour. The mixture is stirred at 100° C. for a further hour, then made alkaline with sodium carbonate and filtered hot. 20 parts of sodium iodide are added to the filtrate which is then cooled and filtered. The solid residue is dried and crystallised from 95% ethyl alcohol when there is obtained 6-amino-4-methylaminocinnoline 1-methiodide, M. P. 276–8° C.

Example 8

7 parts of 6-amino-4-methylaminocinnoline are dissolved in a mixture of 120 parts of water and 80 parts of aqueous N-hydrochloric acid. 14 parts of 4-chloro-2-methylamino-6-methylpyrimidine 1-methiodide are then added and the mixture is boiled under reflux for 3 hours. The mixture is cooled and filtered and the solid is crystallised from water when there is obtained 4-methylamino-6-(2'-methylamino - 6' - methylpyrimidyl-4'-amino)cinnoline 1'-methiodide hydrochloride M. P. 288–290° C. (decomp.). This hydrochloride is dissolved in water, the solution is made alkaline by the addition of sodium carbonate and then sodium iodide is added. The solid is filtered off and crystallised from water when there is obtained 4-methylamino-6-(2'-methylamino-6'-methylpyrimidyl-4'-amino)cinnoline 1'-methiodide trihydrate, M. P. 296° C. (decomp.).

The starting material used in the process of this example may be obtained as follows:

5 parts of 6-nitro-4-methylaminocinnoline, 1 part of Raney nickel and 50 parts of glacial acetic acid are shaken in an atmosphere of hydrogen until the theoretical amount of hydrogen is absorbed. The mixture is then filtered and the filtrate is made alkaline with sodium hydroxide. It is then filtered and the solid residue is washed with water and dried. It is crystallised from water and there is obtained 6-amino-4-methylaminocinnoline, M. P. 300° C.

Example 9

1 part of 4:6-diaminocinnoline 1-methiodide and 1 part of 2-methylamino-4-methylthiopyrimidine 1-methiodide are mixed and heated at 170–175° C. for 5 hours. The mixture is then dissolved in water and 5 parts of sodium iodide are added. It is then filtered and the solid is crystallised from methyl alcohol when there is obtained 4-amino-6-(2'-methylaminopyrimidyl-4'-amino)-cinnoline 1:1'-dimethiodide, M. P. 274–8° C.

The starting material used in the process of this example may be obtained as follows:

2.58 parts of 2-chloro-4-aminopyrimidine (Gabriel, Berichte der Deutschen Chemischen Gesellschaft, 38, 1691), 3.4 parts of methyl iodide and 10 parts of β-ethoxyethanol are heated together under reflux for 5 hours. The mixture is then cooled and filtered, and the solid is washed with hot ethyl acetate and dried. It is then crystallised from water and 2-chloro-4-aminopyrimidine 1-methiodide is obtained, M. P. 202–204° C. (decomp.).

Example 10

2.2 parts of 4:6-diaminocinnoline 1-methiodide, 2 parts of 2-chloro-4-aminopyrimidine 1-methiodide, 10 parts of water and 7.5 parts of aqueous N-hydrochloric acid are boiled together under reflux for 3 hours. The mixture is then cooled and filtered and the solid is dissolved in water. 5 parts of sodium iodide are then added, the solid is filtered off and crystallised from water when there is obtained 4-amino-6-(4'-aminopyrimidyl-2'-amino)cinnoline 1:1'-dimethiodide, M. P. 322° C. (decomp.).

Example 11

6 parts of 4:6-diaminocinnoline 1-methiodide, 6 parts of 4-chloro-2-methylamino-6-ethylpyrimidine 1-methiodide, 10 parts of water and 1 part of aqueous N-hydrochloric acid are boiled together under reflux for 1 hour. The mixture is then cooled and filtered. The solid is crystallised from water and there is obtained 4-amino-6-(2'-methylamino - 6' - ethylpyrimidyl-4'-amino)cinnoline 1:1'-dimethiodide, M. P. 320° C. (decomp.).

Example 12

3 parts of 4:6-diaminocinnoline are dissolved in a mixture of 40 parts of aqueous N-hydrochloric acid and 60 parts of water, and 7 parts of 4 - chloro-2-iso-propylamino-6-methylpyrimidine 1-methiodide are added. The mixture is boiled under reflux for 1 hour, cooled and filtered. The solid is dissolved in 200 parts of water, 20 parts of sodium iodide are added and the mixture is filtered. The solid is crystallised from water when there is obtained 4-amino-6-(2'-iso-propylamino - 6' - methylpyrimidyl-4'-amino)cinnoline 1'-methiodide hydriodide, M. P. 287° C. (decomp.).

This hydriodide is dissolved in water and the solution is made alkaline with sodium carbonate. The precipitate is filtered off and crystallised from water when there is obtained 4-amino-6-(2'-iso-propylamino - 6' - methylpyrimidyl-4'-amino)cinnoline 1'-methiodide, M. P. 270° C. (decomp.).

Example 13

0.9 part of 4:6-diaminocinnoline 1-methiodide are dissolved in 16 parts of water and 4 parts of aqueous N-hydrochloric acid and 1.1 parts of 4-bromo-2-isopropylamino-6-methylpyrimidine 1-methiodide are added. The mixture is boiled under reflux for 3 hours then cooled and filtered. The solid is dissolved in water and sodium iodide is added. The solid is filtered off and is crystallised from water when there is obtained 4 - amino - 6 - (2' - isopropylamino - 6' - methylpyrimidyl-4'-amino)cinnoline 1:1'-dimethiodide, M. P. 320° C. (decomp.).

Example 14

11 parts of 4:6-diamino-3-methylcinnoline, 19 parts of 4-chloro-2-amino-6-methylpyrimidine 1-methiodide, 10 parts of concentrated hydrochloric acid and 500 parts of water are heated together at 100° C. for 90 minutes. The mixture is filtered and the solid is washed with 500 parts of hot water and the combined filtrate and washings is treated with 500 parts of sodium iodide. The mixture is cooled and filtered and the solid is washed with 250 parts of acetone. It is then crystallized from water and there is obtained 4-amino-6-(2'-amino - 6' - methylpyrimidyl - 4'-amino)-3-methylcinnoline 1' - methiodide hydriodide, M. P. 263–265° C. (decomp.).

1.5 parts of the hydriodide are dissolved in 40 parts of hot water and the solution is made alkaline with sodium carbonate. The mixture is cooled and filtered. The solid residue is crystallised from water and there is obtained 4-amino - 6 - (2'-amino - 6' - methylpyrimidyl-4'-amino)cinnoline 1'-methiodide dihydrate, M. P. 270° C. (decomp.).

The starting material used in the process of this example may be obtained as follows:

1.4 parts of 6-nitro-4-amino-3-methylcinnoline (Kereford, Schofield, and Simpson, Journal of the Chemical Society, 1948, 360), 0.5 part of Raney nickel and 150 parts of methyl alcohol are shaken together in an atmosphere of hydrogen until the theoretical amount of hydrogen is absorbed. The mixture is filtered and the filtrate is evaporated. The residue is 4:6-diamino-3-methylcinnoline, M. P. 272–4° C.

What is claimed is:

1. As new compounds, the quaternary salts of pyrimidylamino-cinnolines of the general formula:

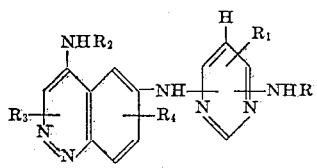

wherein $R_1$ is a radical from the group consisting of lower alkyl, and —NHR; R and $R_2$ are radicals from the group consisting of hydrogen and lower alkyl; and $R_3$ and $R_4$ are radicals from the group consisting of hydrogen and lower alkyl.

2. A process for the manufacture of quaternary salts of the type claimed in claim 1, which comprises reacting a quaternary salt of a compound of the general formula:

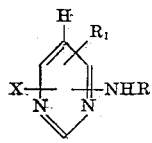

wherein X is a radical from the group consisting of halogen and —$SR_5$; $R_5$ being a hydrocarbon radical; and $R_1$ and R have the significance specified in claim 1, with a compound selected from the group consisting of the quaternary salts and free base form of a cinnoline derivative of the general formula:

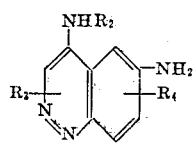

wherein $R_2$, $R_3$ and $R_4$ have the significance specified in claim 1.

3. As new compounds, the quaternary salts of the cinnoline derivatives of the general formula

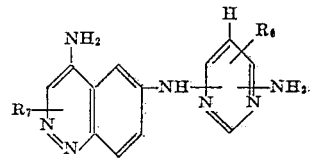

wherein $R_6$ and $R_7$ are lower alkyl radicals.

4. As new compounds, the quaternary salts of the cinnoline derivatives of the general formula

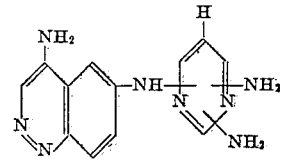

5. As new compounds, the quaternary salts of the cinnoline derivatives of the general formula

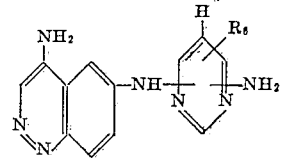

wherein $R_6$ is a lower alkyl group.

6. As new compounds, the quaternary salts of the cinnoline derivatives of the general formula

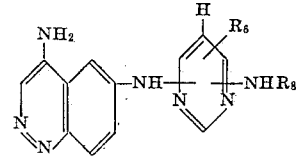

wherein $R_6$ and $R_8$ are lower alkyl groups.

7. As new compounds, the quaternary salts of the cinnoline derivatives of the general formula:

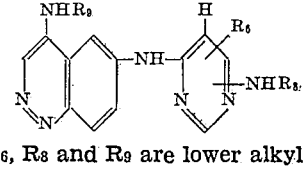

wherein $R_6$, $R_8$ and $R_9$ are lower alkyl groups.

8. As a new compound, 4-amino-6-(2'-amino-6'-methylpyrimidyl - 4' - amino) - 3 - methylcinnoline-1'-methiodide hydriodide.

9. As a new compound, 4-amino-6-(2':6'-diaminopyrimidyl-4'-amino) cinnoline-3' - methiodide hydriodide.

10. As a new compound, 4-amino-6-(2'-amino-6'-methyl pyrimidyl-4'-amino) cinnoline-1:1'-dimethiodide.

11. As a new compound, 4-amino-6-(2'-methylamino - 6' - methylpyrimidyl - 4' - amino) cinnoline-1:1'-dimethiodide.

12. As a new compound, 4-methylamino-6-(2'-methylamino - 6' - methylpyrimidyl - 4' - amino) cinnoline-1:1'-dimethiodide.

WALTER HEPWORTH.
MURIEL RUTH CURD,
Executrix of the Estate of Francis Henry Swinden Curd, Deceased.

No references cited.